United States Patent
Sugimoto et al.

(10) Patent No.: US 11,267,954 B2
(45) Date of Patent: Mar. 8, 2022

(54) RUBBER COMPOSITION

(71) Applicant: THE YOKOHAMA RUBBER CO., LTD., Tokyo (JP)

(72) Inventors: Hiroki Sugimoto, Hiratsuka (JP); Tsuyoshi Nomaguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 16/485,244

(22) PCT Filed: Feb. 14, 2018

(86) PCT No.: PCT/JP2018/005065
§ 371 (c)(1),
(2) Date: Aug. 12, 2019

(87) PCT Pub. No.: WO2018/151148
PCT Pub. Date: Aug. 23, 2018

(65) Prior Publication Data
US 2019/0359797 A1    Nov. 28, 2019

(30) Foreign Application Priority Data

Feb. 15, 2017 (JP) .............................. JP2017-025757
Feb. 15, 2017 (JP) .............................. JP2017-025758

(51) Int. Cl.
*C08L 7/00* (2006.01)
*B60C 1/00* (2006.01)

(52) U.S. Cl.
CPC .................. *C08L 7/00* (2013.01); *B60C 1/00* (2013.01); *B60C 2001/0066* (2013.01)

(58) Field of Classification Search
CPC ... C08L 9/00; C08L 7/00; C08L 61/04; B60C 1/00; B60C 2001/0066; C08K 3/04; C08K 5/55
See application file for complete search history.

(56) References Cited

U.S. PATENT DOCUMENTS

| | | | |
|---|---|---|---|
| 7,307,116 B2 | 12/2007 | Mizuno et al. | |
| 2012/0053262 A1* | 3/2012 | Chen ..................... | B60C 1/0025 523/150 |
| 2012/0283372 A1* | 11/2012 | Veyland .................... | C08K 5/07 524/335 |
| 2013/0295209 A1 | 11/2013 | Ikari et al. | |
| 2016/0167449 A1* | 6/2016 | Poorters .................... | B60C 1/00 152/541 |
| 2017/0218185 A1* | 8/2017 | Takahashi ................ | C08K 3/04 |
| 2017/0267026 A1* | 9/2017 | Noguchi .................. | C09C 1/482 |

FOREIGN PATENT DOCUMENTS

| | | |
|---|---|---|
| JP | S59-109538 A | 6/1984 |
| JP | S62-48742 A | 3/1987 |
| JP | H06-212025 A | 8/1994 |
| JP | 2002-327093 A | 11/2002 |
| JP | 2002-338734 A | 11/2002 |
| JP | 2007-099868 A | 4/2007 |
| JP | 2011-157525 A | 8/2011 |
| JP | 2011-231221 A | 11/2011 |
| JP | 2012-177021 A | 9/2012 |
| WO | 2012/099117 A1 | 7/2012 |
| WO | WO-2015173993 A1 * | 11/2015 ................ C08L 9/00 |
| WO | WO-2016027382 A1 * | 2/2016 ............. C08K 5/098 |

OTHER PUBLICATIONS

Types of Common Carbon Black, www.ganpatiexim.com (Year: 2021).*

* cited by examiner

*Primary Examiner* — Angela C Scott
(74) *Attorney, Agent, or Firm* — Carrier Blackman & Associates, P.C.; Joseph P. Carrier; Anne G. Sabourin

(57) ABSTRACT

A rubber composition including 100 parts by mass of a diene rubber containing natural rubber, and blended with from 40 to 80 parts by mass of carbon black, cobalt neodecanoate borate represented by the following Chemical Formula (1), a phenolic resin, a curing agent, sulfur, and a vulcanization accelerator, wherein the carbon black has DBP oil absorption of from $50\times10^{-5}$ to $80\times10^{-5}$ m³/kg, and iodine adsorption of from 100 to 150 g/kg, and a vulcanized rubber has characteristics of a dynamic storage modulus (E') at a dynamic strain of 2% and at 20° C. of 8 MPa or more, a tangent loss (tan δ) at 60° C. of 0.20 or less, and the number of times of repetition until fracture is caused in a constant strain fatigue test at a strain of 60% and at 400 rpm of 45,000 or more.

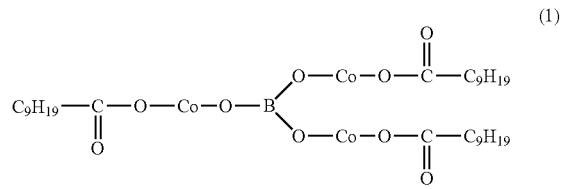

(1)

4 Claims, 1 Drawing Sheet

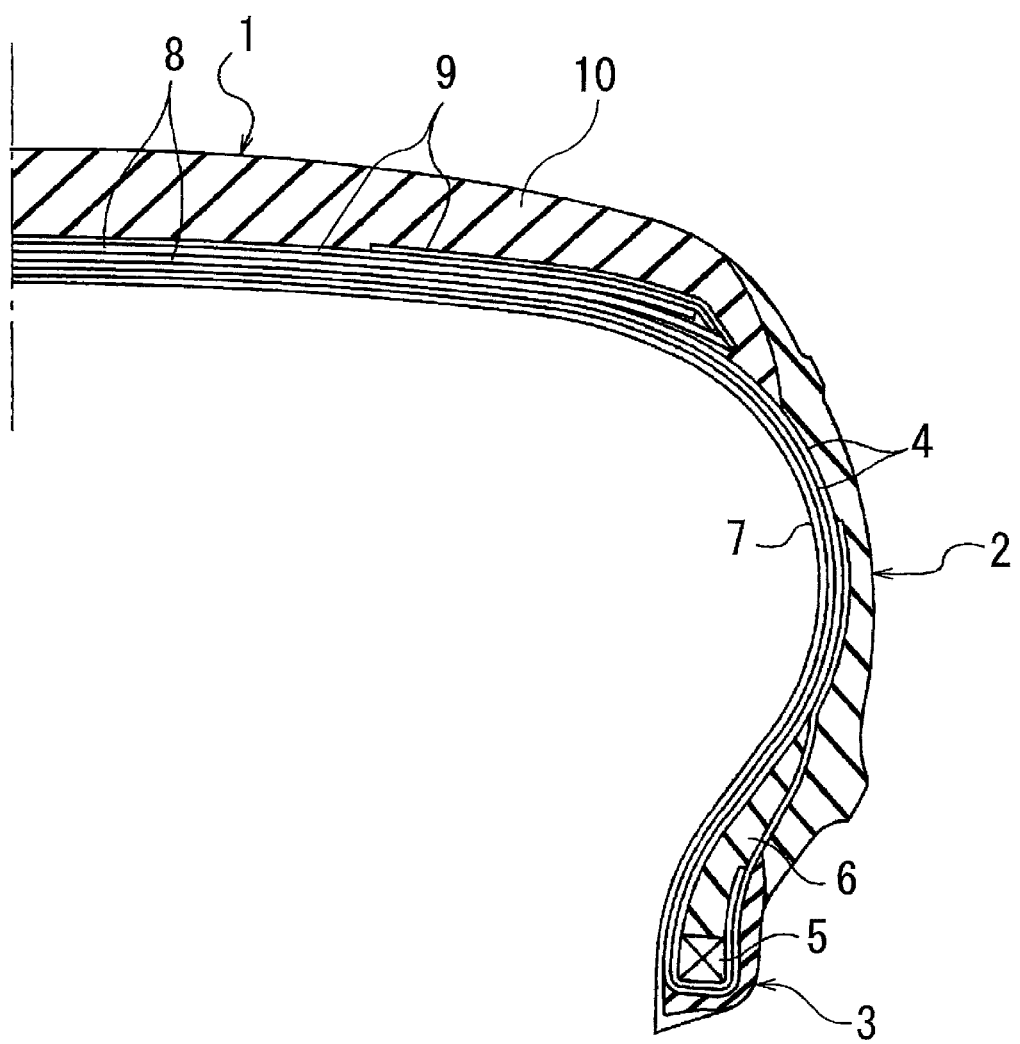

RUBBER COMPOSITION

TECHNICAL FIELD

The present invention relates to a rubber composition that provides improved adhesion performance with steel cords and improved tire durability.

BACKGROUND ART

In some pneumatic tires, a tread portion is formed from a carcass layer in which steel cords are coated with coat rubber (a rubber composition for coating steel cords), and a belt layer. When the adhesion between the steel cords and the rubber member decreases with long term use, it is easily to cause failure and tire durability tends to reduce. However, in recent years, the use period of tires tends to be longer, and thus it has increasingly become important to increase a reinforcing effect of steel cords and to maintain durability over a long period of time.

Patent Document 1 proposes improvement of the adhesion of steel cords by using a rubber composition in which a cobalt salt of an organic acid is blended with a diene rubber. However, the level required by consumers to improve the adhesion of the steel cords and the tire durability is higher than the above, and further improvement has been demanded.

CITATION LIST

Patent Literature

Patent Document 1: JP 2007-99868 A

SUMMARY OF INVENTION

Technical Problem

An object of the present invention is to provide a rubber composition that provides improved adhesion performance with steel cords and improved tire durability to or beyond conventional levels.

Solution to Problem

A rubber composition according to an embodiment of the present invention that can achieve the object described above includes: 100 parts by mass of diene rubber containing natural rubber and blended with from 40 to 80 parts by mass of carbon black; cobalt neodecanoate borate represented by the following Chemical Formula (1); a phenol resin; a curing agent; sulfur; and a vulcanization accelerator, wherein the carbon black has DBP oil absorption of from $50 \times 10^{-5}$ to $80 \times 10^{-5}$ m$^3$/kg and iodine adsorption of from 100 to 150 g/kg, and a vulcanized rubber has characteristics of a dynamic storage modulus (E') at a dynamic strain of 2% and at 20° C. of 8 MPa or more, a tangent loss (tan δ) at 60° C. of 0.20 or less, and the number of times of repetition until fracture is caused in a constant strain fatigue test at a strain of 60% and at 400 rpm of 45,000 or more.

[Chemical Formula 1]

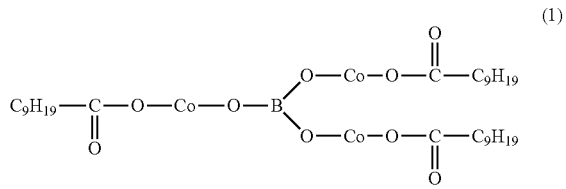

(1)

Advantageous Effects of Invention

The rubber composition according to an embodiment of the present invention includes: 100 parts by mass of a diene rubber containing natural rubber and blended with from 40 to 80 parts by mass of carbon black having specific DBP oil absorption and specific iodine adsorption; cobalt neodecanoate borate; a phenolic resin; a curing agent; sulfur; and a vulcanization accelerator, of which vulcanized rubber characteristics are adjusted to a dynamic storage modulus (E') at 20° C. of 8 MPa or more, a loss of tangent (tan δ) at 60° C. of 0.20 or less, and the number of times of repetition until fracture is caused in a constant strain fatigue test at a strain of 60% and at 400 rpm of 45,000 or more, and thus the adhesion performance with steel cords and tire durability can be improved to or beyond conventional levels.

The rubber composition, obtained by mixing the diene rubber, the carbon black, the cobalt neodecanoate borate, the phenolic resin, the curing agent, the sulfur, and the vulcanization accelerator preferably has a water content of 0.25 mass % or more. The adhesive performance with steel cords and tire durability can be maintained at higher levels.

The rubber composition according to an embodiment of the present invention includes preferably from 0.3 to 1.5 parts by mass of the cobalt neodecanoate borate, based on 100 parts by mass of the diene rubber, 0.5 parts by mass or more and less than 3.0 parts by mass of the phenolic resin, and from 0.5 to 5.0 parts by mass of the curing agent.

The composition includes more preferably from 0.1 to 1.0 parts by mass, based on 100 parts by mass of the diene rubber, of a sulfenamide-based vulcanization accelerator.

In a pneumatic tire in which the rubber composition according to an embodiment of the present invention is used in a belt layer, the adhesion performance with steel cords is improved and tire durability is improved to or beyond conventional levels.

BRIEF DESCRIPTION OF DRAWINGS

FIG. 1 is a partial cross-sectional view of a tire in a meridian direction illustrating a pneumatic tire according to an embodiment of the present invention.

DESCRIPTION OF EMBODIMENTS

A rubber composition according to an embodiment of the present invention can be suitably used as coat rubber in a carcass layer and/or belt layer in a pneumatic tire. FIG. 1 is a cross-sectional view illustrating a pneumatic tire according to an embodiment. The pneumatic tire is formed from a tread portion 1, a sidewall portion 2, and a bead portion 3.

In FIG. 1, two carcass layers 4 formed by arranging reinforcing cords extending in a tire radial direction at a predetermined interval in a tire circumferential direction between left and right bead portions 3 and embedding the reinforcing cords in a rubber layer are run, and both ends of the two carcass layers 4 are folded back from the inside to the outside in a tire axial direction such that the both ends are made to hold a bead filler 6 around a bead core 5 that is embedded in the bead portion 3. An inner liner layer 7 is disposed inside the carcass layer 4. Two belt layers 8 formed by arranging reinforcing cords extending inclined to the tire circumferential direction in the tire axial direction at a predetermined interval and embedding these reinforcing cords in a rubber layer are disposed circumferentially outward of the carcass layer 4 of the tread portion 1. The reinforcing cords of the two belt layers 8 intersect such that the inclination directions to the tire circumferential direction are opposite to each other in the layers. Additionally, a belt cover layer 9 is disposed circumferentially outward of the belt layers 8. A tread rubber 10 is disposed circumferentially outward of the belt cover layer 9 to form the tread portion 1. The reinforcing cords forming the carcass layer 4 and/or the belt layer are formed of steel cords, and the rubber that covers the steel cords is preferably formed from the rubber composition for coating steel cords according to the embodiment of the present invention.

The rubber composition according to the embodiment of the present invention includes 100 parts by mass of a diene rubber containing a natural rubber and blended with from 40 to 80 parts by mass of carbon black having DBP oil absorption of from $50\times10^{-5}$ to $80\times10^{-5}$ m$^3$/kg and iodine adsorption of from 100 to 150 g/kg; cobalt neodecanoate borate; a phenolic resin; a curing agent; sulfur; and a vulcanization accelerator, wherein when the composition is vulcanized, the composition has characteristics of a dynamic storage modulus (E') at a dynamic strain of 2% and at 20° C. of 8 MPa or more, a tangent loss (tan δ) at 60° C. of 0.20 or less, and the number of times of repetition until fracture is caused in a constant strain fatigue test at a strain of 60% and at 400 rpm of 45,000 or more.

In the vulcanized rubber obtained by vulcanization of the rubber composition, the dynamic storage modulus (E') at a dynamic strain of 2% and at 20° C. is 8 MPa or more, preferably 8 MPa or more and less than 16 MPa, more preferably from 9 to 15 MPa, and more preferably from 10 to 14 MPa. When the dynamic storage elastic modulus (E') is less than 8 MPa, the adhesive performance with steel cords is inferior, and tire durability is insufficient. The dynamic storage modulus (E') can be increased or decreased by the composition of the rubber composition and vulcanization conditions such as temperature and time. In the present specification, the dynamic storage modulus (E') is measured by using a viscoelastic spectrometer under conditions of a frequency of 20 Hz, an initial strain of 10%, a dynamic strain of ±2%, and a temperature of 20° C. in accordance with JIS-K6394.

The vulcanized rubber obtained by the vulcanization of the rubber composition has a loss of tangent (tan δ) at 60° C. of 0.20 or less, preferably from 0.14 to 0.20, and more preferably from 0.15 to 0.19. When the tan δ at 60° C. exceeds 0.20, the adhesion performance with steel cords tends to reduce, and tire durability is insufficient. The tan δ at 60° C. can be increased or decreased by the composition of the rubber composition and vulcanization conditions such as temperature and time. In the present specification, tan δ at 60° C. is measured by using a viscoelastic spectrometer under conditions of a frequency of 20 Hz, an initial strain of 10%, a dynamic strain of ±2%, and a temperature of 60° C. in accordance with JIS-K6394.

The vulcanized rubber obtained by the vulcanization of the rubber composition has a tensile fatigue property of the number of times of repetition until fracture is caused in a constant strain fatigue test at a strain of 60% and at 400 rpm of 45,000 or more, preferably 50,000 or more, more preferably 55,000 or more. The number of times of repetition until fracture is caused in the constant strain fatigue test is preferably 70,000 or less, more preferably 65,000 or less. When the fatigue life in the constant strain fatigue test at a strain of 60% and at 400 rpm is less than 45,000, tire durability is insufficient. A tensile fatigue property can be adjusted by the composition of the rubber composition, and vulcanization conditions such as temperature and time. In the present specification, the tensile fatigue property is measured by using a dumbbell-shaped test piece III (thickness: 2 mm) under conditions of a temperature of 20° C., a strain of 60%, and a test frequency of 6.67 Hz (the number of times of rotation: 400 rpm) in accordance with JIS-K6270.

In the rubber composition according to the embodiment of the present invention, the diene rubber includes necessarily natural rubber. The content of the natural rubber is preferably 80 mass % or more, more preferably from 90 to 100 mass % in 100 mass % of the diene rubber. When the content of the natural rubber is not less than 80 mass %, the adhesion with the steel cord (for example, cross ply peeling force) can be ensured and thus, this is preferable.

The rubber composition according to the embodiment of the present invention may include diene rubber other than the natural rubber as the diene rubber. Examples of the diene rubber can include isoprene rubber, butadiene rubber, styrene-butadiene rubber, acrylonitrile-butadiene rubber, butyl rubber, and halogenated butyl rubber. Especially, isoprene rubber, butadiene rubber, styrene-butadiene rubber, and halogenated butyl rubber are preferred. These diene rubbers may be used alone or as any blend thereof. The content of the other diene rubber is preferably 20 mass % or less, more preferably from 0 to 10 mass % in 100 mass % of the diene rubber.

The rubber composition according to the embodiment of the present invention includes 100 parts by mass of the diene rubber described above and from 40 to 80 parts by mass of carbon black. When the carbon black is blended in such a range, the mechanical properties of the rubber composition can be ensured and excellent tire durability can be obtained. The amount of the carbon black blended is preferably from 43 to 75 parts by mass, more preferably from 45 to 70 parts by mass. When the amount of the carbon black blended is less than 40 parts by mass, the fatigue life in the constant strain fatigue test deteriorates, and tire durability reduces. Additionally, when the amount of the carbon black blended exceeds 80 parts by mass, the tan δ at 60° C. deteriorates.

The carbon black used in the embodiment of the present invention is ISAF grade carbon black, especially ISAF grade carbon black having a small structure. When ISAF grade carbon black having a large structure that is usually used in a rubber composition for a tread is blended with the rubber composition for coating steel cords, tire durability is inferior as the rubber composition for coating steel cords.

In the rubber composition according to the embodiment of the present invention, the carbon black has DBP oil absorption of from $50\times10^{-5}$ to $80\times10^{-5}$ m$^3$/kg, preferably from $60\times10^{-5}$ to $78\times10^{-5}$ m$^3$/kg. When the DBP oil absorption of the carbon black is less than $50\times10^{-5}$ m$^3$/kg, reinforcement reduces and tire durability reduces. When the DBP oil absorption exceeds $80\times10^{-5}$ m$^3$/kg, the fatigue life in the constant strain fatigue test deteriorates, and tire durability reduces. In the present specification, CTAB adsorption specific surface area is measured in accordance with JIS K 6217-3.

The carbon black has iodine adsorption of from 100 to 150 g/kg, preferably from 105 to 125 g/kg. When the iodine adsorption of the carbon black is less than 100 g/kg, reinforcement reduces and tire durability reduces. When the iodine adsorption exceeds 150 g/kg, the tan δ at 60° C. deteriorates and durability reduces. In the present specification, the iodine adsorption is measured in accordance with JIS K 6217-1.

In the embodiment of the present invention, the carbon black has a nitrogen adsorption specific surface area ($N_2SA$) of preferably from $90 \times 10^{-3}$ to $115 \times 10^{-3}$ m²/kg, more preferably from $95 \times 10^{-3}$ to $110 \times 10^{-3}$ m²/kg. When $N_2SA$ of the carbon black is less than $90 \times 10^{-3}$ m²/kg, reinforcement reduces and tire durability reduces. Additionally, when $N_2SA$ of the carbon black exceeds $115 \times 10^{-3}$ m²/kg, the tan δ at 60° C. deteriorates and durability reduces. In the present specification, $N_2SA$ is measured in accordance with JIS K6217-2.

In the embodiment of the present invention, inorganic fillers other than the carbon black may be blended. Examples of the other inorganic fillers can include silica, clay, talc, mica, and calcium carbonate. Among these, silica is preferable, and silica can made the tan δ at 60° C. smaller.

In the rubber composition according to the embodiment of the present invention, the adhesion with steel cords is increased by blending the cobalt neodecanoate borate. The cobalt neodecanoate borate is a compound represented by the following Chemical Formula (1), and is blended in an amount of preferably from 0.3 to 1.5 parts by mass, more preferably more than 0.5 parts by mass and 1.5 parts by mass or less, based on 100 parts by mass of the diene rubber. When the amount of the cobalt neodecanoate borate blended is 0.3 parts by mass or more, the initial adhesion and durability adhesion with the steel cords can be made sufficiently high, and thus this is preferable. Additionally, when the amount of the cobalt neodecanoate borate blended is 1.5 parts by mass or less, a constant strain fatigue property can be ensured and tire durability can be improved, and thus this is preferable.

[Chemical Formula 2]

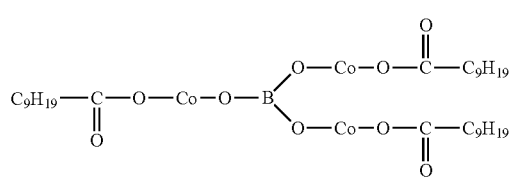

(1)

The cobalt neodecanoate borate may have a cobalt content of preferably from 18 to 26 mass %, more preferably from 20 to 24 mass %. Examples of the cobalt neodecanoate borate can include Manobond C22.5 and Manobond 680 C (available from Rhodia), CoMend A and CoMend B (available from Shepherd), and DICNATE NBC-II (available from DIC CORPORATION).

The rubber composition according to the embodiment of the present invention includes the phenolic resin and the curing agent of the phenolic resin blended with the diene rubber. When the phenolic resin and the curing agent are blended, it is possible to improve the hardness, the tensile elongation at break, and the adhesion performance with the steel cords of the rubber composition, and tire durability can be made excellent.

Examples of the phenolic resin can include a cresol resin, a resorcin resin, an alkyl phenol resin, and a modified phenol resin. Examples of the modified phenol resin includes a cashew-modified phenol resin, an oil-modified phenol resin, an epoxy-modified phenol resin, an aniline-modified phenol resin, and a melamine-modified phenol resin.

The cresol resin is a compound obtained by reacting cresol with formaldehyde, and a compound using m-cresol is particularly preferable. Examples of the cresol resin can include Sumikanol 610 (available from Sumitomo Chemical Co., Ltd.), and SP7000 (available from Nippon Shokubai Co., Ltd.).

The resorcin resin is a compound obtained by reacting resorcin with formaldehyde, and examples of the resorcin resin can include Penacolite B-18-S, B-19-S, B-20-S, and B-21-S (available from INDSPEC Chemical Corporation). Additionally, as the resorcin resin, a modified resorcin resin may be used, and examples of the resorcin resin can include a resorcin resin modified with an alkyl phenol or the like. A resorcin-alkyl phenol-formaldehyde copolymer or the like can be exemplified.

The cashew-modified phenol resin is a phenol resin modified with cashew oil, and examples of the cashew-modified phenol resin can include Sumilite Resin PR-YR-170 and PR-150 (available from Sumitomo Bakelite Co., Ltd.), and Phenolite A4-1419 (available from Dainippon Ink and Chemical Industries, Ltd.). The phenol resin is a resin that is not modified and obtained by reacting phenol with formaldehyde, and examples of the phenol resin can include Sumikanol 620 (available from Sumitomo Chemical Co., Ltd.).

The phenolic resin may be blended in an amount of preferably 0.5 parts by mass or more and less than 3 parts by mass, more preferably from 0.7 to 2.0 parts by mass, based on 100 parts by mass of the diene rubber. When the phenolic resin is blended in an amount of less than 0.5 parts by mass, a dynamic storage modulus (E') reduces, the tan δ at 60° C. increases, the adhesion with the steel cords reduces, and tire durability tends to be insufficient. Additionally, when the phenolic resin is blended in an amount of 3 parts by mass or more, the tan δ at 60° C. contrarily increases, a constant strain fatigue property reduces, and tire durability tends to reduce.

In the embodiment of the present invention, the curing agent for curing the phenolic resin is blended. Examples of the curing agent include hexamethylene tetramine, hexamethoxymethyl melamine, hexamethoxymethylol melamine, pentamethoxymethyl melamine, hexaethoxymethyl melamine, a polymer of para-formaldehyde, and an N-methylol derivative of melamine. These methylene donors can be used alone or as any blend thereof.

Examples of the hexamethylene tetramine can include Sanceller HT-PO (available from Sanshin Chemical Industry Co., Ltd.). Examples of the hexamethoxymethylol melamine (HMMM) can include CYREZ 964RPC (available from CYTEC INDUSTRIES). Examples of the pentamethoxymethyl melamine (PMMM) can include SUMIKANOL 507 A (available from BARA CHEMICAL Co., LTD.).

The curing agent may be blended in an amount of preferably from 0.5 to 5 parts by mass, more preferably from 0.7 to 4.0 parts by mass based on 100 parts by mass of the diene rubber. When the amount of the curing agent blended is less than 0.5 parts by mass, a dynamic storage modulus (E') reduces, the tan δ at 60° C. increases, the adhesion with the steel cords reduces, and tire durability tends to be insufficient. Additionally, when the amount of the curing agent blended exceeds 5 parts by mass, a constant strain fatigue property reduces, and tire durability tends to reduce.

The rubber composition according to the embodiment of the present invention includes sulfur and the vulcanization accelerator blended with the diene rubber. The sulfur is blended in an amount of preferably from 3.0 to 9.0 parts by mass, more preferably from 4.0 to 8.0 parts by mass, based on 100 parts by mass of the diene rubber. When the amount of the sulfur blended is less than 3.0 parts by mass, the adhesion with the steel cords tends to reduce. Additionally, when the amount of the sulfur blended exceeds 9.0 parts by mass, tire durability tends to reduce. In the present specification, the amount of the sulfur blended is a net amount of the sulfur present in the sulfur and/or the vulcanizing agent blended for the vulcanization.

The vulcanization accelerator is not particularly limited, and is preferably a sulfenamide-based vulcanization accelerator. Examples of the sulfenamide-based vulcanization accelerator can include N,N-dicyclohexyl-1,3-benzothiazole-2-sulfenamide (DZ), N-cyclohexyl-2-benzothiazole sulfenamide (CZ), N-oxydiethylene-2-benzothiazole sulfenamide (OBS), and N-(tert-butyl)benzothiazole-2-sulfeneamide (NS). These sulfenamide-based vulcanization accelerators may be used alone or as a combination of multiple kinds. Among these, N,N-dicyclohexyl-1,3-benzothiazole-2-sulfenamide (DZ) and/or N-(tert-butyl)benzothiazole-2-sulfeneamide (NS) are blended preferably.

The vulcanization accelerator is blended in an amount of preferably from 0.1 to 1.0 part by mass, more preferably from 0.2 to 0.8 parts by mass based on 100 parts by mass of the diene rubber. When the amount of the vulcanization accelerator blended is less than 0.1 parts by mass, the tan δ at 60° C. increases, and tire durability tends to reduce. Additionally, when the amount of the vulcanization accelerator blended exceeds 1.0 part by mass, adhesion at the time of deterioration tends to reduce. The sulfenamide-based vulcanization accelerator may be blended as the vulcanization accelerator in an amount of preferably from 0.1 to 1.0 part by mass, more preferably from 0.2 to 0.8 parts by mass based on 100 parts by mass of the diene rubber.

In the embodiment of the present invention, to suppress prevulcanization (scorching and scorch), the sulfur and the vulcanization accelerator described above are mixed with the diene rubber at a final mixing step separately from the other blending agents including the carbon black, the cobalt neodecanoate borate, the phenolic resin, the curing agent, and the like. The rubber composition according to the embodiment of the present invention may have a water content of preferably 0.25 mass % or more, more preferably 0.30 mass % or more after the final mixing step. The rubber composition obtained by mixing the diene rubber, the carbon black, the cobalt neodecanoate borate, the phenolic resin, the curing agent, the sulfur, and the vulcanization accelerator may have a water content of preferably 0.25 mass % or more. Note that in the present specification, the water content of the rubber composition is a content (mass %) of water present in 100 mass % of the rubber composition prior to vulcanization, and can be measured in accordance with a Karl-Fischer method.

When the water content of the rubber composition after the final mixing step is less than 0.25 mass %, the chemical reaction related to cobalt proceeds insufficiently, and the adhesion with the steel cords and tire durability tend to reduce. To make the water content of the rubber composition 0.25 mass % or more, at the final mixing step, water or a water-containing substance can be added to the rubber composition immediately before taking the rubber composition out from a rubber kneading machine, a processing time with batch out liquid can be lengthened, or a drying time can be shortened, and thus the water content can be adjusted.

The rubber composition may include various types of additives blended that are commonly used in a rubber composition for use in a tire, such as a vulcanization accelerator aid, an anti-aging agent, a peptizing agent, various kinds of oil, and a plasticizer. The additives can be kneaded by a common method to form a rubber composition and can be used for the vulcanization or crosslinking. The additives can be blended in any conventional general amount, as long as the object of the present invention is not impaired. The rubber composition according to the embodiment of the present invention can be produced by mixing the components described above by using a usually used rubber kneading machine such as a Banbury mixer, a kneader, or a roll.

The rubber composition according to the embodiment of the present invention can be produced by blending and kneading the carbon black, the cobalt neodecanoate borate, the phenolic resin, and the curing agent with the diene rubber containing the natural rubber, cooling the obtained kneaded product, and then blending and mixing the sulfur and the sulfur vulcanization accelerator at the final mixing step. The water content of the rubber composition after the final mixing step is adjusted to preferably 0.25 mass % or more. The obtained rubber composition is vulcanized, and thus it is possible to obtain a vulcanized product having excellent vulcanized rubber characteristics of a dynamic storage modulus (E') at a dynamic strain of 2% and at 20° C. of 8 MPa or more, a tangent loss (tan δ) at 60° C. of 0.20 or less, and the number of times of repetition until fraction is caused in the constant strain fatigue test at a strain of 60% and at 400 rpm of 45,000 or more.

Additionally, In the embodiment of the present invention, a preferable method for producing the rubber composition may include: blending and kneading from 0.3 to 1.5 parts by mass of the cobalt neodecanoate borate, 0.5 parts by mass or more and less than 3.0 parts by mass of the phenolic resin, and from 0.5 to 5.0 parts by mass of the curing agent with 100 parts by mass of the diene rubber containing the natural rubber; cooling the kneaded product; then blending and mixing from 0.1 to 1.0 parts by mass of the sulfur and the sulfenamide-based vulcanization accelerator and, optionally, water and/or a water-containing substance at the final mixing step; and adjusting the water content after the final mixing step to 0.25 mass % or more. The water and the water-containing substances may be blended in an amount of preferably from 0.01 to 5 parts by mass, more preferably from 0.05 to 2 parts by mass, still more preferably from 0.1 to 1.5 parts by mass based on 100 parts by mass of the diene rubber.

The rubber composition according to the embodiment of the present invention can be suitably used for forming a steel cord-covering portion in a pneumatic tire. The rubber composition is preferably used as coat rubber that covers a steel cord of a belt layer and/or a carcass layer. The rubber composition is particularly preferably used as coat rubber that covers a steel cord of a belt layer. In a pneumatic tire in which the rubber composition according to the embodiment of the present invention is used as coat rubber for steel cords, the adhesion performance with the steel cords is improved, and thus peeling between the steel cord and the covering rubber can be suppressed. Accordingly, the durability of the pneumatic tire can be maintained and improved to or beyond conventional levels.

Embodiments of the present invention is further described below by examples. However, the scope of the present invention is not limited to these examples.

EXAMPLES

When 18 rubber compositions including blends shown in Tables 1 and 2 (Examples 1 to 8, Standard Example, and Comparative Examples 1 to 9) were prepared, components other than sulfur and a vulcanization accelerator were weighed, the mixture was kneaded for 5 minutes in a 1.7 L sealed Banbury mixer, and then a master batch of the mixture was discharged and allowed to stand to cool at room temperature. The muster batch was put in the 1.7 L sealed Banbury mixer and sulfur and the vulcanization accelerator were added, and mixed to obtain a rubber composition. Note that in Examples 7 and 8, the sulfur and the vulcanization accelerator were added, the mixture was mixed for a certain amount of time to sufficiently disperse the sulfur and the vulcanization accelerator, then water was added, and the kneaded product was discharged at a timing at which the temperature of the kneaded product began to elevate, and a rubber composition was obtained. Note that the water content (mass %) of the finally mixed rubber composition was measured by a coulometric titration method by using KF-200 (available from Mitsubishi Chemical Corporation) in accordance with a Karl Fischer method.

Test pieces were produced by vulcanizing the obtained rubber composition in a mold having a prescribed shape at 170° C. for 10 minutes to evaluate a dynamic storage modulus (E'), the tan δ at 60° C., and a constant strain fatigue test by methods described below. The adhesion with steel cords (index rubber deposition amount) and tire durability tests were performed by methods described below.

Dynamic Storage Modulus (E') and Tan δ at 60° C.

The dynamic storage modulus (E') at a temperature of 20° C. and the loss tangent tan δ at a temperature of 60° C. of the obtained test piece were measured by using a viscoelastic spectrometer available from Toyo Seiki Seisaku-Sho, Ltd. under conditions of an initial strain of 10%, a dynamic strain of ±2%, and a frequency of 20 Hz in accordance with JIS K6394. The results of the obtained E' and tan δ are shown in the columns "E' at 20° C." and "tan δ at 60° C." in Tables 1 and 2.

Constant Strain Fatigue Test

A dumbbell JIS3 test piece was produced by using the obtained test piece in accordance with JIS K6251, and a tensile constant strain fatigue test was performed under conditions of a temperature of 20° C., a strain of 60%, and a test frequency of 6.67 Hz (the number of times of rotation of 400 rpm) referring to JIS-K6270, and the number of times of repetition until fracture was caused was measured. The obtained results are listed in the column "Tensile constant strain fatigue property" in Tables 1 and 2.

Adhesion with Steel Cord (Index Rubber Deposition Amount)

Brass-plated steel cords that were arranged in parallel at an interval of 12.7 mm were coated with the rubber composition, and embedded by an embedding length of 12.7 mm, and was bonded by vulcanization under vulcanizing conditions of a temperature of 170° C. and time of 10 minutes to produce a sample. The steel cords were pulled out of the sample, and an evaluation was performed by an index rubber deposition amount (%) of the rubber covering the surface of the steel cord, in accordance with ASTM D-2229. The obtained results are shown in the column "Index Rubber Deposition Amount" in Tables 1 and 2.

Tire Durability Test

The obtained rubber composition was used as coat rubber in a belt layer to obtain a pneumatic tire (size 295/35 R21) by vulcanization molding. The obtained tire was mounted on a rim (21×10.5 J), and was filled with gas having an oxygen concentration of 100%, and an air pressure was adjusted to 350 kPa. The tire was allowed to stand in an environment having a temperature of 70° C. for 14 days. Subsequently, the air pressure was adjusted to 170 kPa, the tire was subjected to an indoor drum testing machine based on JIS D4230 having a drum diameter of 1707 mm, and a 6,000 km running test was performed at a speed of 60 km/hour while increasing a load by 13% every two hours from 88% of a JATMA-specified weight. After the running test, the tire was taken to pieces, and an amount of edge separation in the belt layer (mm) was measured. The obtained results are shown in the column "Tire Durability (peeling amount)" in Tables 1 and 2.

TABLE 1

| | | Standard Example | Example 1 | Example 2 | Example 3 | Example 4 | Example 5 | Example 6 | Example 7 | Example 8 |
|---|---|---|---|---|---|---|---|---|---|---|
| NR | Parts by mass | 100.0 | 100.0 | 100.0 | 100.0 | 100.0 | 100.0 | 100.0 | 100.0 | 100.0 |
| CB - 1 | Parts by mass | 60.0 | | | | | 15.0 | | | |
| CB - 2 | Parts by mass | | 60.0 | 60.0 | 60.0 | 60.0 | 45.0 | 60.0 | 60.0 | 60.0 |
| Zinc oxide | Parts by mass | 8.0 | 8.0 | 8.0 | 8.0 | 8.0 | 8.0 | 8.0 | 8.0 | 8.0 |
| Anti-aging agent | Parts by mass | 1.0 | 1.0 | 1.0 | 1.0 | 1.0 | 1.0 | 1.0 | 1.0 | 1.0 |
| Co Stearate | Parts by mass | 1.0 | 1.0 | 0.5 | | 1.0 | 1.0 | 1.0 | 1.0 | 0.5 |
| Co neodecanoate borate | Parts by mass | 0.5 | 0.5 | 1.0 | 1.5 | 0.5 | 0.5 | 0.5 | 0.5 | 1.0 |
| Phenolic resin-1 | Parts by mass | 1.0 | 1.0 | 1.0 | 1.0 | 1.0 | 1.0 | | 1.0 | 1.0 |
| Phenolic resin-2 | Parts by mass | | | | | | | 1.0 | | |
| Curing agent | Parts by mass | 3.0 | 3.0 | 3.0 | 3.0 | 3.0 | 3.0 | 3.0 | 3.0 | 3.0 |
| Sulfur | Parts by mass | 7.5 | 7.5 | 7.5 | 7.5 | 7.5 | 7.5 | 7.5 | 7.5 | 7.5 |
| Vulcanization accelerator-1 | Parts by mass | 0.7 | 0.7 | 0.7 | 0.7 | | 0.7 | 0.7 | 0.7 | 0.7 |
| Vulcanization accelerator-2 | Parts by mass | | | | | 0.5 | | | | |
| Water | Parts by mass | | | | | | | | 1.0 | 1.0 |
| Water Content after Final Mixing | Mass % | 0.22 | 0.22 | 0.22 | 0.22 | 0.22 | 0.22 | 0.22 | 0.35 | 0.34 |
| E' at 20° C. | MPa | 12.1 | 11.8 | 13.3 | 14.0 | 11.8 | 12.0 | 12.8 | 12.2 | 13.5 |
| Tan δ at 60° C. | — | 0.18 | 0.18 | 0.16 | 0.15 | 0.18 | 0.19 | 0.18 | 0.17 | 0.15 |
| Tensile Constant Strain Fatigue Property | Times | 45000 | 60000 | 62000 | 64000 | 60000 | 58000 | 62000 | 60000 | 62000 |
| Index Rubber Deposition Amount | % | 80 | 80 | 80 | 90 | 75 | 80 | 85 | 90 | 90 |
| Tire Durability (peeling amount) mm | | 3 | 1 | 1 | 1 | 2 | 1 | 1 | 1 | 1 |

TABLE 2

|   |   | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| NR | Parts by mass | 100.0 | 100.0 | 100.0 | 100.0 | 100.0 | 100.0 | 100.0 | 100.0 | 100.0 |
| CB-1 | Parts by mass | 40.0 |  |  |  |  |  |  | 15.0 | 60.0 |
| CB-2 | Parts by mass | 20.0 | 60.0 | 60.0 | 60.0 | 60.0 | 60.0 | 60.0 | 45.0 |  |
| Zinc oxide | Parts by mass | 8.0 | 8.0 | 8.0 | 8.0 | 8.0 | 8.0 | 8.0 | 8.0 | 8.0 |
| Anti-aging agent | Parts by mass | 1.0 | 1.0 | 1.0 | 1.0 | 1.0 | 1.0 | 1.0 | 1.0 | 1.0 |
| Co Stearate | Parts by mass | 1.0 | 1.9 |  | 1.0 | 1.0 | 1.0 | 1.0 | 1.0 | 2.0 |
| Co neodecanoate borate | Parts by mass | 0.5 | 0.1 | 2.0 | 0.5 | 0.5 | 0.5 | 0.5 | 0.5 |  |
| Phenolic resin-1 | Parts by mass | 1.0 | 1.0 | 1.0 | 0.2 | 3.5 | 1.0 | 1.0 | 1.0 | 1.0 |
| Curing agent | Parts by mass | 3.0 | 3.0 | 3.0 | 3.0 | 3.0 | 0.2 | 6.0 | 3.0 | 3.0 |
| Sulfur | Parts by mass | 7.5 | 7.5 | 7.5 | 7.5 | 7.5 | 7.5 | 7.5 | 5.0 | 9.0 |
| Vulcanization accelerator-1 | Parts by mass | 0.7 | 0.7 | 0.7 | 0.7 | 0.7 | 0.7 | 0.7 | 0.7 | 0.7 |
| Water Content after Final Mixing | Mass % | 0.22 | 0.22 | 0.22 | 0.22 | 0.22 | 0.22 | 0.22 | 0.22 | 0.22 |
| E' at 20° C. | (MPa) | 11.5 | 12.1 | 14.0 | 7.5 | 13.1 | 9.5 | 14.0 | 7.5 | 12.0 |
| Tan δ at 60° C. | — | 0.18 | 0.18 | 0.18 | 0.17 | 0.22 | 0.25 | 0.17 | 0.21 | 0.15 |
| Tensile Constant Strain Fatigue Property | Times | 40000 | 35000 | 30000 | 35000 | 25000 | 30000 | 30000 | 70000 | 45000 |
| Index Rubber Deposition Amount | % | 80 | 70 | 75 | 50 | 80 | 55 | 50 | 40 | 40 |
| Tire Durability (peeling amount) mm |  | 3 | 3 | 3 | 4 | 4 | 5 | 5 | 7 | 7 |

The types of starting materials used in Tables 1 and 2 are described below.

NR: Natural rubber: TSR 20

CB-1: Carbon black HAF grade LS, SEAST 300, available from Tokai Carbon Co., Ltd., DBP oil absorption of $75 \times 10^{-5}$ m³/kg, iodine adsorption of 86 g/kg, nitrogen adsorption specific surface area of $84 \times 10^{-3}$ m²/kg CB-2: Carbon black ISAF grade LS, SEAST 600, available from Tokai Carbon Co., Ltd., DBP oil absorption of $75.6 \times 10^{-5}$ m³/kg, iodine adsorption of 112.8 g/kg, nitrogen adsorption specific surface area of $101.9 \times 10^{-3}$ m²/kg Zinc oxide: Zinc Oxide III, available from Seido Chemical Industry Co., Ltd.

Anti-aging agent: Santoflex 6PPD, available from Flexsys

Co Stearate: cobalt stearate, cobalt stearate, available from DIC CORPORATION (cobalt content: 9.5 mass %)

Co neodecanoate borate: cobalt neodecanoate borate represented by the above Chemical Formula (1), DICNATE NBC-II, available from DIC CORPORATION (cobalt content: 22.2 mass %)

Phenolic resin-1: Resorcin resin, PENACOLITE RESIN B-18-S, available from INDSPEC Phenolic resin-2: Cresol resin, Sumikanol 610, available from Sumitomo Chemical Co., Ltd.

Curing agent: Hexamethoxymethylol melamine (HMMM), CYREZ 964 RPC, available from CYTEC INDUSTRIES Sulfur: Mucron OT-20, available from Shikoku Chemicals Corporation (sulfur content: 80 mass %)

Vulcanization accelerator-1: N,N'-dicyclohexyl-1,3-benzothiazol-2-sulfenamide, NOCCELER DZ, available from Ouchi Shinko Chemical Industrial Co., Ltd.

Vulcanization accelerator-2: N-(tert-butyl)benzothiazol-2-sulfenamide, NOCCELER NS, available from Ouchi Shinko Chemical Industrial Co., Ltd.

As is clear from Table 1, it was confirmed that in the rubber compositions of Examples 1 to 8, the deposition amount (%) of the rubber adhering to the steel cords was high, the amount of the edge-separation in the belt layer was suppressed, and tire durability was improved to or beyond that in Standard Example.

As is clear from Table 2, in the rubber composition of Comparative Example 1, since the carbon black CB-2 having specific DBP oil absorption and iodine adsorption is present in an amount of less than 40 parts by mass, and a constant strain fatigue life is less than 45,000, edge-separation increases.

The rubber composition of Comparative Example 2 has a constant strain fatigue life of less than 45,000, and thus the adhesion with the steel cords (index rubber deposition amount) is inferior, and edge separation increases.

The rubber composition of Comparative Example 3 has a constant strain fatigue life of less than 45,000, and thus the adhesion with the steel cords (index rubber deposition amount) is inferior, and edge separation increases.

The rubber composition of Comparative Example 4 has a dynamic storage modulus (E') at 20° C. of less than 8 MPa and a constant strain fatigue life of less than 45,000, and thus, the adhesion with the steel cords (index rubber deposition amount) is inferior, and edge separation increases.

The rubber composition of Comparative Example 5 has a tan δ at 60° C. of more than 0.20 and a constant strain fatigue life of less than 45000, and thus edge separation increases.

The rubber composition of Comparative Example 6 has a tan δ at 60° C. of more than 0.20 and a constant strain fatigue life of less than 45000, and thus the adhesion with the steel cords (index rubber deposition amount) is inferior, and edge separation increases.

The rubber composition of Comparative Example 7 has a constant strain fatigue life of less than 45,000, and thus the adhesion with the steel cords (index rubber deposition amount) is inferior, and edge separation increases.

The rubber composition of Comparative Example 8 has a dynamic storage modulus (E') at 20° C. of less than 8 MPa and a tan δ at 60° C. of more than 0.20, and thus the adhesion with the steel cords (index rubber deposition amount) is inferior, and edge separation increases.

In the rubber composition of Comparative Example 9, the carbon black CB-1 dose not satisfy the requirements of specific DBP oil absorption and iodine adsorption, and the cobalt neodecanate borate is not blended, and thus the adhesion with the steel cords (index rubber deposition amount) is inferior, and edge-separation increases.

The invention claimed is:

1. A rubber composition comprising: 100 parts by mass of a diene rubber containing natural rubber and blended with from 40 to 80 parts by mass of carbon black; cobalt neodecanoate borate represented by Chemical Formula (1) present in an amount from 0.3 to 1.5 parts by mass; a phenolic resin present in amount of 0.5 parts by mass or more and less than 3.0 parts by mass; a methylene donor curing agent present in an amount from 0.5 to 5.0 parts by mass, based on 100 parts by mass of the diene rubber; sulfur; and a vulcanization accelerator, the carbon black having DBP oil absorption of from $50 \times 10^{-5}$ to $80 \times 10^{-5}$ m$^3$/kg, a nitrogen absorption specific area (N$_2$SA) of 90 to 115 m$^2$/g, and iodine adsorption of from 100 to 150 g/kg, wherein the rubber composition formed by mixing the diene rubber, the carbon black, the cobalt neodecanoate borate, the phenolic resin, the curing agent, the sulfur, and the vulcanization accelerator has a water content of 0.25 mass % or more, and wherein when the rubber composition is vulcanized it has characteristics of a dynamic storage modulus (E') at a dynamic strain of 2% and at 20° C. of 8 MPa or more, a tangent loss (tan δ) at 60° C. of 0.20 or less, and the number of times of repetition until fracture is caused in a constant strain fatigue test at a strain of 60% and at 400 rpm of 45,000 or more

[Chemical Formula 1]

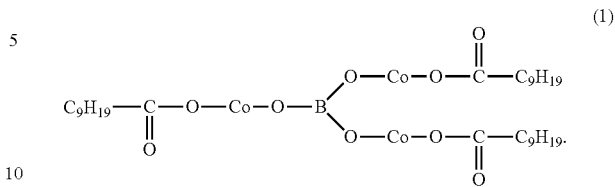

2. The rubber composition according to claim 1, wherein a sulfenamide-based vulcanization accelerator is present in an amount of from 0.1 to 1.0 part by mass based on 100 parts by mass of the diene rubber.

3. A pneumatic tire comprising a belt layer formed from the rubber composition according to claim 1.

4. A pneumatic tire comprising a belt layer formed from the rubber composition according to claim 2.

* * * * *